US011364625B2

(12) United States Patent
Berwers et al.

(10) Patent No.: US 11,364,625 B2
(45) Date of Patent: Jun. 21, 2022

(54) LINK FOR AN ARTICULATED MANIPULATOR (71) Applicant: State Of The Art Ltd., Ta'Xbiex (MT)

(72) Inventors: Leander Marcel Berwers, Ta'Xbiex (MT); Kuijpers Peter, Moergestel (NL)

(73) Assignee: State Of The Art Ltd., Ta' Xbiex (MT)

( * ) Notice: Subject to any disclaimer, the term of this patent is extended or adjusted under 35 U.S.C. 154(b) by 457 days.

(21) Appl. No.: 16/305,399

(22) PCT Filed: May 23, 2017

(86) PCT No.: PCT/EP2017/062356
§ 371 (c)(1),
(2) Date: Nov. 29, 2018

(87) PCT Pub. No.: WO2017/207337
PCT Pub. Date: Dec. 7, 2017

(65) Prior Publication Data
US 2020/0324405 A1  Oct. 15, 2020

(30) Foreign Application Priority Data
Jun. 2, 2016  (NL) ..................................... 2016878

(51) Int. Cl.
*B25J 9/06* (2006.01)
*B25J 9/12* (2006.01)
(Continued)

(52) U.S. Cl.
CPC . *B25J 9/06* (2013.01); *B25J 9/12* (2013.01); *B25J 9/1692* (2013.01); *B25J 17/025* (2013.01); *B25J 18/00* (2013.01); *B25J 19/022* (2013.01)

(58) Field of Classification Search
CPC . B25J 9/06; B25J 9/1692; B25J 17/025; B25J 18/00; B25J 19/022
(Continued)

(56) References Cited

U.S. PATENT DOCUMENTS 4,570,065 A  *  2/1986  Pryor ..................... B25J 18/002
                                                    250/227.11
4,736,645 A  *  4/1988  Zimmer ............... B25J 17/0291
                                                    74/417

(Continued)

FOREIGN PATENT DOCUMENTS

| DE | 811765 C | 8/1951 |
| EP | 1415774 A1 | 5/2004 |
| JP | 2003056772 A | 2/2003 |

*Primary Examiner* — William C Joyce
(74) *Attorney, Agent, or Firm* — N.V. Nederlandsch Octrooibureau (57) ABSTRACT Link for an articulated manipulator, comprising a tubular body extending along a longitudinal axis thereof and having a first joint end and a second joint end, wherein the first joint end and the second joint end define a first joint plane and a second joint plane, respectively. The first joint plane and the second joint are each at an inclination angle with respect to the longitudinal axis, wherein the first joint plane is arranged parallel to a first axis and wherein the second joint plane is arranged parallel to a second axis, the longitudinal axis being perpendicular to the first axis and second axis, and wherein the first axis and second axis are at a mutual twist angle of at least one times the inclination angle.

14 Claims, 7 Drawing Sheets

(51) Int. Cl.
*B25J 9/16* (2006.01)
*B25J 17/02* (2006.01)
*B25J 18/00* (2006.01)
*B25J 19/02* (2006.01)

(58) Field of Classification Search
USPC .......................................................... 901/17
See application file for complete search history.

(56) References Cited

U.S. PATENT DOCUMENTS 4,771,652 A * 9/1988 Zimmer ............... B25J 17/0291
74/640
4,904,148 A 2/1990 Larsson
6,922,610 B2 * 7/2005 Okamoto ................... B25J 9/06
219/121.74

* cited by examiner

LINK FOR AN ARTICULATED MANIPULATOR

FIELD OF THE INVENTION

The present invention relates to a link for an articulated manipulator, such as a robotic arm.

PRIOR ART

European patent application EP 1415774 A1 discloses an articulated manipulator comprising a plurality of links arranged in series and joints pivotally connecting adjacent links. The joints include coaxial joints each connecting two adjacent links so that the two adjacent links are able to turn about a rotation axis coaxial with the axes of the two adjacent links, and diagonal joints each connecting the two adjacent links so that the two adjacent links are able to turn about an inclined rotation axis inclined at an angle of 45° to the axes of the two adjacent links.

U.S. Pat. No. 4,904,148 discloses a robot arm adapted for use as an industrial robot, comprising a plurality of hollow arm members each having joint portions at opposite ends thereof and a centre axis, wherein ends of the joint portions each include a joint face which is inclined at a certain inclination angle with respect to the centre axis of an associated arm member. Each joint portion has a joint axis disposed at a right angle to its associated joint face. The centre axis intersecting the joint axes at opposite joint faces of the same arm member at points of the joint face is provided with driving means for each adjacent joint portion. In an embodiment, the joint faces located on opposite ends of said intermediate arm member are formed are formed in twisted in relationship relative to each other.

Japanese patent application JP 2003-056772 A describes an adjustable universal joint for a pipeline. The universal joint allows the pipeline to bend in any direction along a seabed and can return the pipeline to a linear shape.

German patent application DE 3545068 A1 describes a drive assembly for a robotic manipulator, comprising an inner, intermediate, and a front segment that are centered on respective axes and that abut each other flatly at planes which intersect at an angle of 60°. Geared drive shafts are provided that extend through the segments for driving the manipulator.

European patent application EP 1415774 A1 discloses an articulated manipulator with joints having diagonal rotation axes inclined with respect to a longitudinal axis of the manipulator. The joints connect links of the manipulator such that the links turn about a rotation axis inclined at an angle of 45° to their axes.

SUMMARY OF THE INVENTION

The present invention seeks to provide an improved link for an articulated manipulator, such as a robotic arm. The link provides an excellent size to weight ratio, size and/or weight to workspace ratio, as well as improved structural rigidity and stability. The link can be manufactured by virtually any method and material deemed necessary and allows for a lightweight modular design of an articulated manipulator providing an improved and evenly distributed workspace volume and reachability there within.

According to the present invention, a link for an articulated manipulator according to the type defined in the preamble is provided comprising a tubular body extending along a longitudinal axis thereof and having a first joint end and a second joint end, wherein the first joint end and the second joint end define a first joint plane and a second joint plane, respectively. The first joint plane has a first normal vector and the second joint plane has a second normal vector, wherein the first and second normal vectors are each at an inclination angle $\beta$ with respect to the longitudinal axis. Further, the first joint plane is arranged parallel to a first axis and the second joint plane is arranged parallel to a second axis, wherein the longitudinal axis is perpendicular to the first axis and the second axis, and wherein the first axis and the second axis are at a mutual twist angle $\alpha$ of at least one times the inclination angle $\beta$.

The link of the present invention provides mutually twisted joint faces defined by the first and second joint planes of which each joint plane or joint face is arranged at an inclination angle $\beta$ with respect to the longitudinal axis of the tubular body, e.g. the link itself. The mutual twist angle $\alpha$ between the two joint planes or joint faces is at least one times the inclination angle $\beta$, thereby providing an improved and evenly distributed workspace volume and reachability within this workspace volume for a plurality of interconnected links of an articulated manipulator. In particular, the twist angle $\alpha$ between the first and second joint planes may be seen as causing a rotation of a workspace volume of a further link by the twist angle $\alpha$. So for a plurality of connected links, individual workspace volumes provided by the plurality of links are evenly distributed through each successive twist angle $\alpha$.

Another advantage of the mutual twist angle $\alpha$ being at least one times the inclination angle $\beta$, is that overlap between individual workspace volumes of interconnected links is kept to a minimum, whilst providing an evenly distributed workspace volume of an articulated manipulator in a most efficient manner possible.

Furthermore, the mutual twist angle $\alpha$ being at least one times the inclination angle $\beta$ allows for fast movement of an articulated manipulator. In particular, the inclination angle $\beta$ allows a link to rotate 360° degrees in clockwise and counter clockwise direction at the first or second joint end without colliding or interfering with further links connected thereto. Then in combination with the twist angle $\alpha$ being at least one times the inclination angle $\beta$, efficient motion planning of each link for an articulated manipulator can be achieved, wherein rotations of links are minimized when the articulated manipulator is required to change its position.

Another advantage of the present invention is that the inclination angle $\beta$ allows for larger (wider) joint ends with respect to a width of the tubular body or the link itself, thereby improving stability and rigidity of an articulated manipulator for all positions, orientations and/or postures within its workspace volume and boundary thereof.

When the link is used for e.g. a driven articulated manipulator, the link may further comprise a joint part arranged at the first or the second joint end, wherein the joint part comprises a drive member providing drive capabilities to the link. A modular interconnection may then be made from a plurality of links, wherein each link comprises such a joint part and drive member, thereby allowing for efficient and cost effective assembly of the articulated manipulator.

In an advantageous embodiment, the twist angle $\alpha$ is at least two times the inclination angle $\beta$, so that workspace volumes of consecutively connected links for an articulated manipulator have no overlap and a combined workspace volume of the consecutively connected links is maximized.

In an advantageous embodiment, the inclination angle is between 30° and 60° degrees. In combination with the twist angle α this embodiment allows for an evenly distributed workspace volume of an articulated manipulator comprising a plurality of links.

In a further embodiment, the first joint end and the second joint end each comprise a circular circumference, so that the first and second joint end remain closed when, for example, further links connected to the first and second joint ends rotate about the respective first and second normal vectors of the link. In an even further embodiment, the circular circumference of the first joint end may have a different radius than a radius of the circular circumference of the second joint end. This allows the link to have different sizes of joint ends, hence different sizes of joint faces, so that an articulated manipulator can be built comprising a plurality of links having joint ends that decrease in size toward an outermost link of the articulated manipulator.

SHORT DESCRIPTION OF DRAWINGS

The present invention will be discussed in more detail below, using a number of exemplary embodiments, with reference to the attached drawings, in which.

DETAILED DESCRIPTION OF EXEMPLARY EMBODIMENTS

Figure 1:
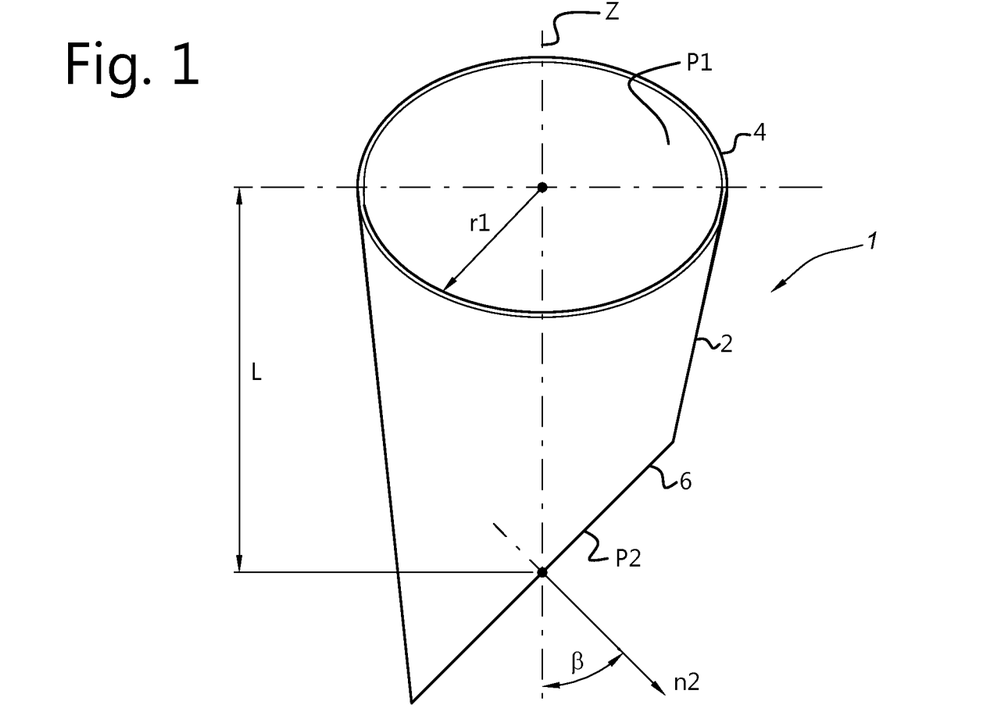
FIG. 1 shows a side view of an embodiment of a link according to the present invention.
Figure 2:
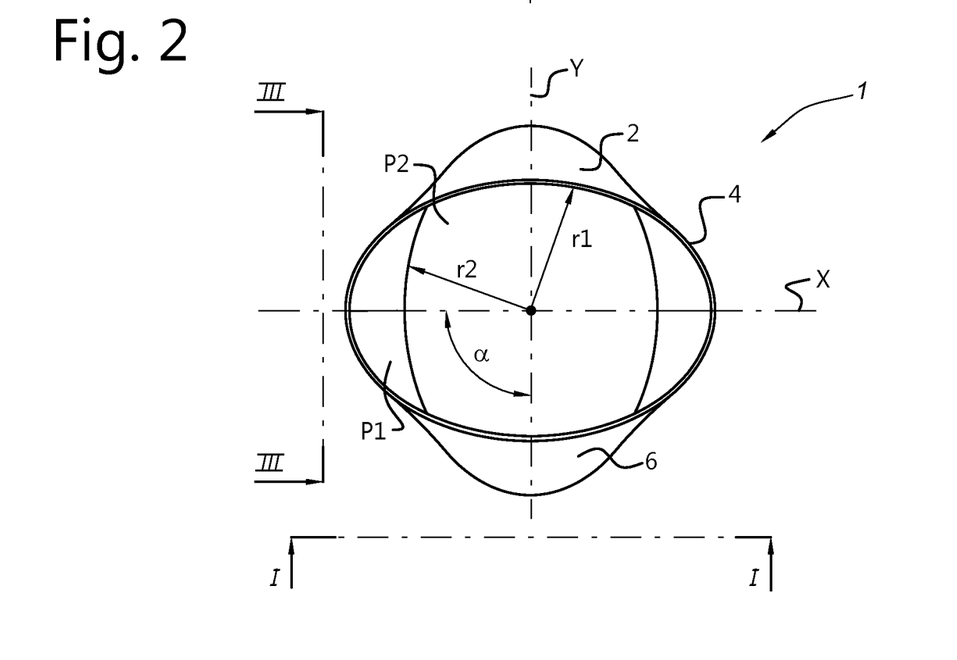
FIG. 2 shows a top view of an embodiment of a link according to the present invention.
Figure 3:
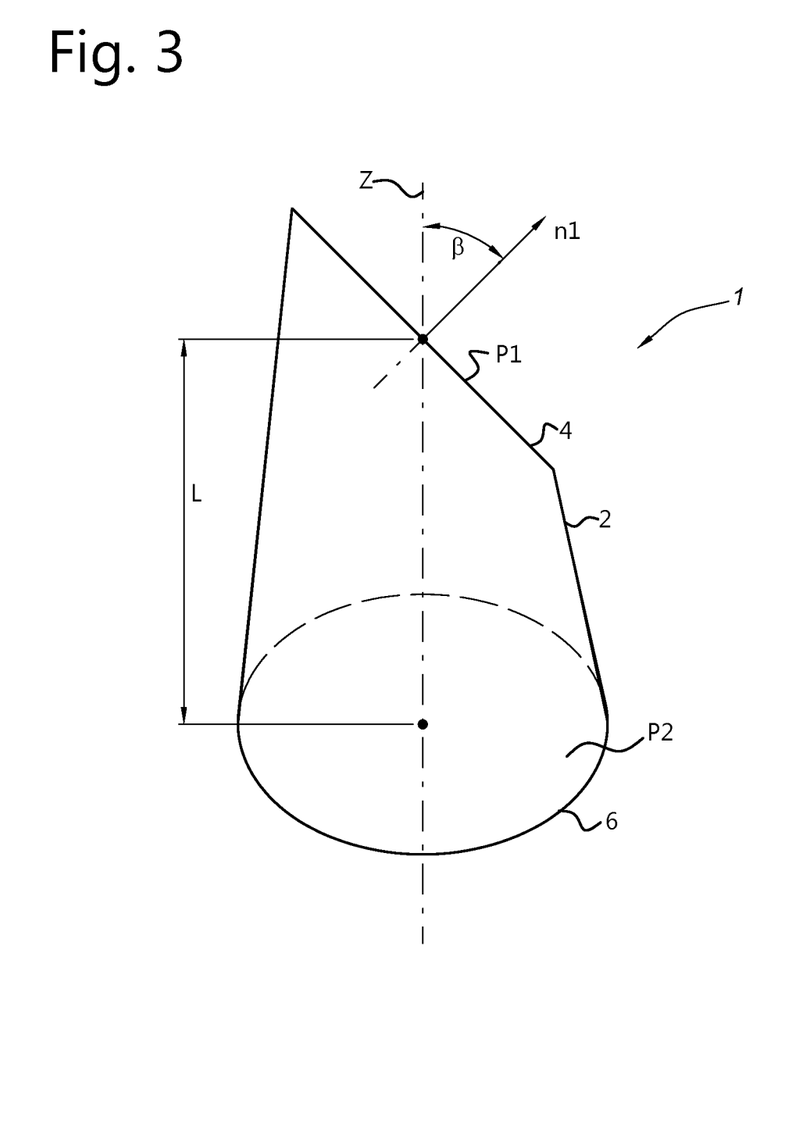
FIG. 3 shows a further side view of an embodiment of a link according to the present invention.

FIGS. 1, 2 and 3 each show a side view, a top view and a further side view of an embodiment of a link according to the present invention. In the depicted embodiment the link 1 comprises a tubular body 2 extending along a longitudinal axis Z thereof and having a first joint end 4 and a second joint end 6, i.e. two opposing joint ends 4, 6. The first joint end 4 and the second joint end 6 each define a first joint plane $p_1$ and a second joint plane $p_2$, respectively. Each joint plane $p_1$, $p_2$ may be viewed or referred to as a joint face $p_1$, $p_2$ configured to engage a joint plane or face of another link 1. As depicted the first and second joint end 4, 6 each comprise an outer circumference or outer rim defining an opening, so that the tubular body 2 comprises a passageway extending from one opening to another opening of the respective joint ends 4, 6. The link 1 has a predetermined length L spanning between respective midpoints of the first and second joint ends 4, 6. The length L of the link 1 may vary and can be chosen to meet particular requirements.

Further, the first joint plane or joint face $p_1$ has a first normal vector $n_1$ and the second joint plane or joint face $p_2$ has a second normal vector $n_2$. Each of the normal vectors $n_1$, $n_2$ defines an axis of rotation, e.g. an axis of rotation relative to another link connected to the first or second joint end 4, 6.

According to the present invention, the first and second normal vector $n_1$, $n_2$ are each at an inclination angle β with respect to the longitudinal axis Z, so both normal vectors $n_1$, $n_2$ (e.g. first and second axes of rotation) are arranged at an inclination angle β relative to the longitudinal axis Z. For ease of reference and without loss of generality, the inclination angle β may be regarded as an acute angle ranging from 0 to 90° degrees.

The first joint plane $p_1$ is arranged parallel to a first axis X and the second joint plane $p_2$ is arranged parallel to a second axis Y, wherein the longitudinal axis Z is perpendicular or orthogonal to the first axis X and the second axis Y, and wherein the first axis X and the second axis Y are at a mutual twist angle α of at least one times the inclination angle β.

In view of the present invention, the inclination angle β of the link 1 retains and allows for 360° degree clockwise and counter clockwise revolutions of the link 1 when connected to a plurality of connected links at the first or second joint end 4, 6, so that the inclination angle β prevents interference or collisions between the plurality of connected links. Furthermore, as the mutual twist angle α between the first and second axis X, Y (i.e. between the first and second joint planes $p_1$, $p_2$) is at least one times the inclination angle β, a workspace volume of an articulated manipulator comprising a plurality of connected links exhibits improved workspace distribution and reachability in all directions within this workspace volume. More precisely, the twist angle α between the first and second joint planes $p_1$, $p_2$ causes a rotation or "twist" by the twist angle α of a further workspace volume of a further link connected to the first or second joint end 4, 6. So for a plurality of connected links according to the present invention, individual workspace volumes provided by each link are evenly distributed through each successive twist angle α. This successive distribution of individual workspace volumes by the twist angle α thus provides an evenly distributed combined workspace volume of the articulated manipulator. As a result, efficient motion planning becomes possible wherein changes in position of the articulated manipulator are achieved through minimal rotations of links, allowing for fast response times as well as fast changes in position.

Another advantage of the inclination angle β in conjunction with the twist angle α is that when the link 1 rotates at e.g. its first joint end 4, i.e. about the first normal vector $n_1$, such a rotation also causes a translation of its second joint end 6. Likewise, when the link 1 rotates at e.g. its second joint end 6, i.e. about the second normal vector $n_2$, such a rotation also causes a translation of its first joint end 4. Therefore, the link 1 of the present invention always provides a rotation and translation of the first or second joint end 4, 6 when the link 1 rotates at its second or first joint end 6, 4, respectively. It is important to note that the link 1 does not solely rotate about its own longitudinal axis Z, so that a rotation of the link 1 at its first or second joint end 4, 6 provides an increased workspaces volume as opposed to a prior art link which is configured to merely rotate about its longitudinal axis.

In an advantageous embodiment, the twist angle α is at least two times the inclination angle β, so that workspace volumes of consecutively connected links have no overlap and a combined workspace volume of the connected links is maximized. For example, in this embodiment an inclination angle β of 45° degrees would provide a mutual twist angle α of at least 90° degrees, thus "twisting" a further workspace volume of a further link connected to e.g. the second joint end 6 by 90° degrees with respect to the first joint end 4. Of course, in other embodiments a twist angle α between one times and two times the inclination angle β can be chosen (e.g. α=1.5 times β) to benefit from an evenly distributed workspace volume and improved reachability in this workspace volume of an articulated manipulator comprising a plurality of links 1 of the present invention.

In an exemplary embodiment the inclination angle β is between 30° and 60° degrees, e.g. 45°. In practical applications this range for the inclination angle β has shown not only to prevent interference between two rotationally connected links, but this range also provides a mutual twist angle α between the first and second axis X, Y, i.e. the first and second joint plane $p_1$, $p_2$, such that workspace volume and reachability within this workspace volume is improved and evenly distributed. In an exemplary embodiment, having an inclination angle β of 45° degrees yields a mutual twist angle α between the first and second axis X, Y of at least 45° degrees. This allows for relative rotation between two connected links providing a large range of motion of e.g. an end effector connected to one of the two links in all directions whilst reducing overlap between workspace volumes of the two connected links. Furthermore, the first and second joint ends 4, 6 may have increased widths by a factor $\sqrt{2}$ compared to prior art embodiments having "straight" joint ends, i.e. joints ends at an inclination angle β of zero (i.e. β=0).

It is noted that according to the present invention, the first axis X and the second axis Y are at a mutual twist angle α of at least one times the inclination angle β, thereby obtaining an evenly distributed workspace volume and improved reachability in this workspace volume of an articulated manipulator comprising a plurality of links 1. However, it is conceivable that an upper limit for the twist angle α is desired to maintain the even distribution and reachability within the workspace. Therefore, embodiments may be considered wherein the first axis X and the second axis Y are at a mutual twist angle α of at least one times the inclination angle β and wherein the twist angle α is less than 180° degrees, or less than e.g. 170°, 150° or 130° degrees. These embodiments maintain an evenly distributed workspace volume and improved reachability in this workspace volume of an articulated manipulator comprising a plurality of links 1. Such an upper limit of the twist angle α may of course be applicable to other relationships between the inclination angle β and the twist angle α. For example, in a further embodiment the twist angle α is at least two times the inclination angle β and wherein the twist angle α is less than 180° degrees, or less than e.g. 170°, 150° or 130° degrees. For embodiments having an upper limit for the twist angle α of less than 180° degrees, the inclination angle β may also be taken between 30° and 60° degrees. With further reference to the FIGS. 1 and 2, in an embodiment the first joint end 4 and the second joint end 6 each comprise a circular circumference, which is indicated by respective radii $r_1$, $r_2$ of the first and second joint end 4, 6. This embodiment allows the first and second joint end 4, 6 to remain closed for full revolutions of links connected to each joint end 4, 6, thus keeping the link 1 sealed from the outside environment.

The link 1 of the present invention allows for a variety of modular designs of an articulated manipulator and as such an embodiment is provided wherein the circular circumference of the first joint end 4 has a different radius $r_1$ than a radius $r_2$ of the circular circumference of the second joint end 6. In this embodiment the link 1 of the present invention allows for different sizes of the first and second joint end 4,6 so that, for example, an articulated manipulator can be assembled comprising a plurality of links decreasing in size and weight toward an outermost link of the articulated manipulator. This is possible as static and dynamic loads experienced by each link of the articulated manipulator tend to decrease toward the outermost link.

Figures 4A, 4B:
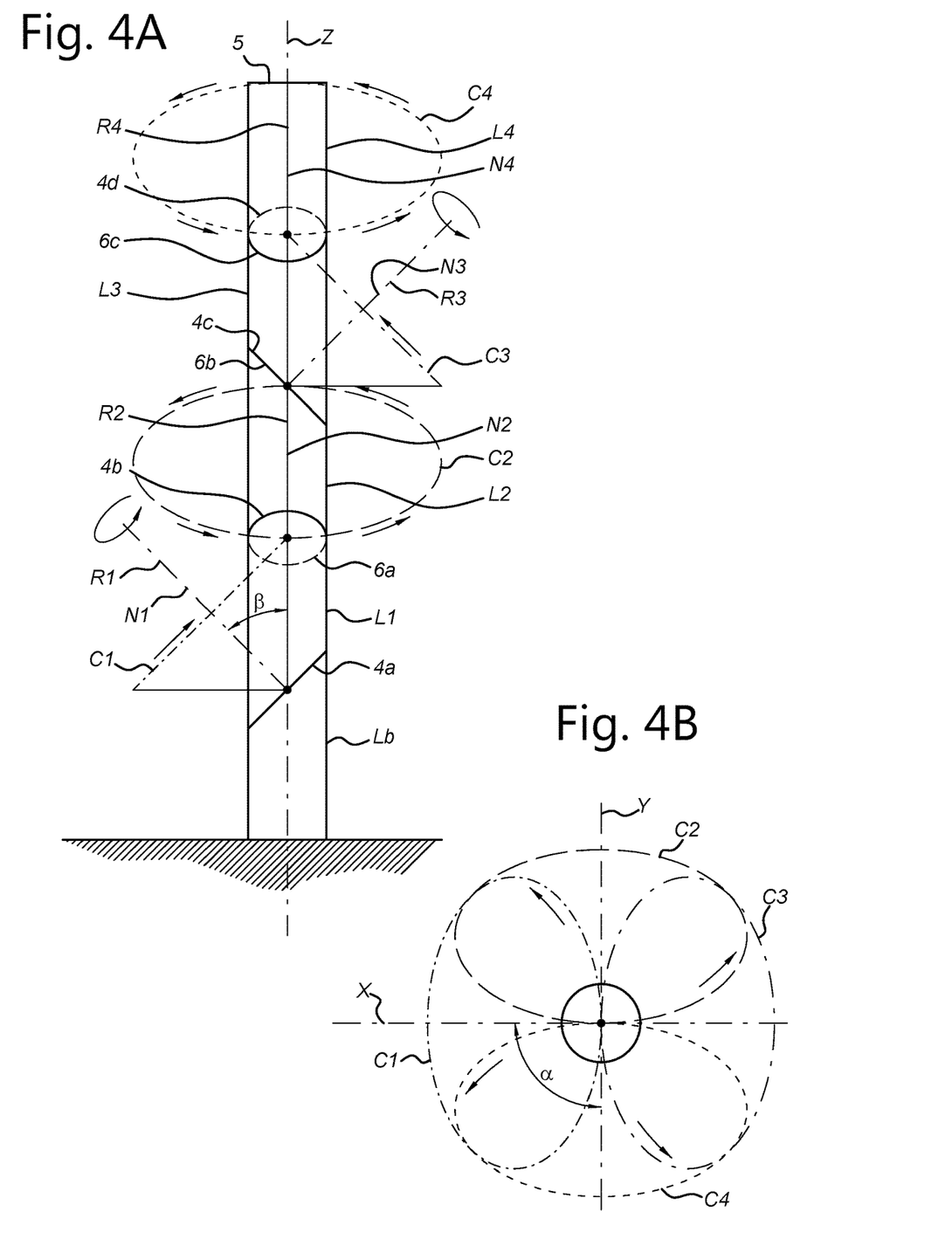
FIG. 4A shows a schematic side view of an embodiment of a plurality of rotationally connected links according to the present invention.
FIG. 4B shows a schematic top view of an embodiment of a plurality of rotationally connected links according to the present invention.

With reference the FIGS. 4A and 4B, in FIG. 4A a schematic side view is depicted of an embodiment of a plurality of rotationally connected links. In FIG. 4B a schematic top view is shown of an embodiment of a plurality of rotationally connected links according to the present invention.

In FIG. 4A an exemplary embodiment is shown clarifying what kind of motion and displacement can be obtained for four links $L_1$, $L_2$, $L_3$, $L_4$ in an arrangement of rotationally connected links according to the present invention with respect to some base $L_b$. In the depicted embodiment of FIG. 4A an inclination angle β has been chosen to be 45° degrees for each joint plane of a first and second joint end 4a, 6a of the first link $L_1$, a first and second joint end 4b, 6b of the second link $L_2$, a first and second joint end 4c, 6c of the third link $L_3$ and a first end 4d of the fourth link $L_4$. The skilled person will appreciate that such an interconnection of links can be continued as needed.

Focussing primarily on the first link $L_1$, it is seen that this link $L_1$ is rotationally connected to the base $L_b$ about an axis of rotation $R_1$, which coincides with a normal vector $n_1$ of an associated joint plane of the first joint end 4a, wherein the axis of rotation $R_1$ is at an inclination angle β with respect to the longitudinal axis Z. When the first link $L_1$ completes one revolution about the axis of rotation $R_1$ (i.e. the normal vector $n_1$) then the second joint end 6a of the first link $L_1$ follows a circular path around the axis $R_1$ and the first link $L_1$ itself traces out a first motion cone $C_1$ as depicted. The first motion cone $C_1$ comprises a 90° degree angle (apex) in this particular embodiment as the inclination angle β has been chosen at 45° degrees. A top view of the circular path of the second end 6a of the first link $L_1$ as part of the first motion cone $C_1$ is clearly depicted in FIG. 4B.

As the inclination angle β has been set at 45° degrees in this example, the mutual twist angle α between the first and second axis X, Y of the first link $L_1$ is at least 45° degrees according to the present invention. However, in this example the mutual twist angle α has been set at 90° degrees, i.e. twice the inclination angle β as shown in FIG. 4B. Because the mutual twist angle α is 90° degrees, the second end 6a of the first link $L_1$ comprises a second joint plane that is a 90° degree rotated version of the first joint plane of the first joint end 4a. As a result the second link $L_2$ connected with its first joint end 4b to the second end 6a of the first link $L_1$ traces out a second motion cone $C_2$ which is a 90° degree rotated version of the first motion $C_1$, assuming other links remain stationary.

Based on the above, it can be inferred that the second, third and fourth motion cone $C_2$, $C_3$, $C_4$ of the respective second, third and fourth link $L_2$, $L_3$, $L_4$ then complete a full revolution about the longitudinal axis Z in evenly distributed steps of 90° degrees. As with the first motion cone $C_1$, each of the second, third and fourth motion cones $C_2$, $C_3$, $C_4$ is obtained by a rotation of the associated link $L_2$, $L_3$, $L_4$ about the respective axis of rotation $R_2$, $R_3$, $R_4$, i.e. normal vectors n2, n3, n4 of each associated joint plane at the inclination angle of 45° degrees and a mutual twist angle of 90° between opposing joint planes of a link.

So in light of FIGS. 4A and 4B, the inclination angle $\beta$ of the first and second normal vectors $n_1$, $n_2$, as well as the mutual twist angle $\alpha$ between the first and second axes X, Y, i.e. between the first and second joint planes $p_1$, $p_2$, allow for an articulated manipulator comprising a plurality of rotationally connected links exhibiting an evenly distributed workspace volume and improved reachability in this workspace volume of an end point or end effector 5 of an outermost link, e.g. see the fourth link $L_4$.

Furthermore, the end effector 5 of an articulated manipulator can be brought at any position and orientation with a minimum of displacements and/or rotations between each link 1 in the articulated manipulator. This becomes particularly evident for an articulated manipulator comprising e.g. six or seven links, also called a redundant manipulator. Such a redundant manipulator comprising links of the present invention is then able to retain a particular position for an end effector 5 while allowing links to move with minimal changes.

With further reference to the embodiments of FIGS. 4A and 4B, the depicted twist angle $\alpha$ is set at 90° degrees and shows that with four links ($L_1$, $L_2$, $L_3$, $L_4$) it is already possible to provide an evenly distributed workspace volume spanning 360° degrees about the longitudinal axis Z as indicated in FIG. 4A. In light of the present invention, the twist angle $\alpha$ is at least one times the inclination angle $\beta$, which is chosen at 45° degrees in the exemplary embodiments of FIGS. 4A and 4B. The mutual twist angle $\alpha$ is then at least 45° degrees. Looking at the top view as shown in FIG. 4B, for a twist angle $\alpha$ of 45° degrees the first, second, third and fourth motion cones $C_1$, $C_2$, $C_3$, $C_4$ would span around 180° degrees about the longitudinal axis Z as identified in FIG. 4A.

Figure 4C:
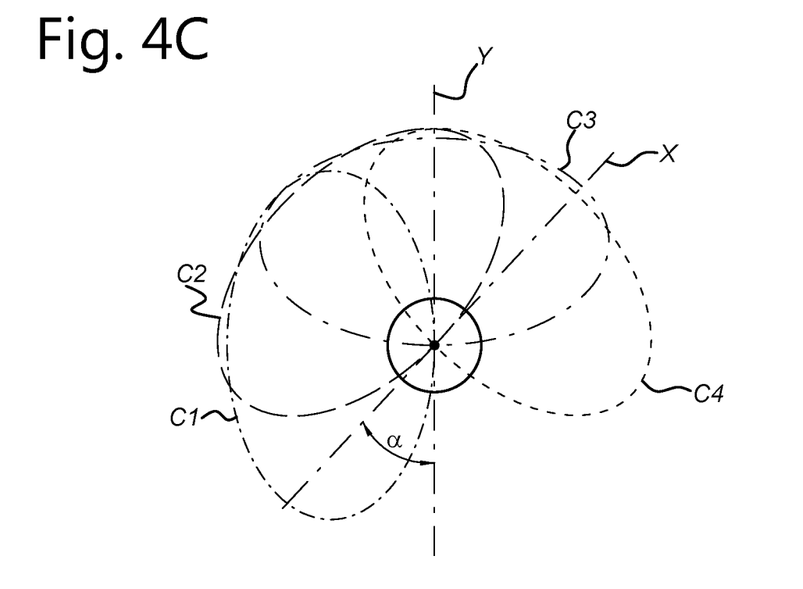
FIG. 4C shows a another schematic top view of an embodiment of a plurality of rotationally connected links according to the present invention.

FIG. 4C depicts an embodiment wherein the twist angle $\alpha$ has been set to one times the inclination angle $\beta$ of 45° degrees, i.e. thus wherein the twist angle $\alpha$ is at least 45° degrees. In this embodiment it is clearly shown that the above mentioned motion cones $C_1$, $C_2$, $C_3$, $C_4$ are positioned closer together and do not span a full 360° degrees about the longitudinal axis Z as indicated in FIG. 4A. However, as each link successively provides a twist angle $\alpha$ of 45° degrees to a workspace volume of a following link, an evenly distributed combined workspace volume for an articulated manipulator is obtained having minimal overlap whilst having a maximal area coverage, allowing for efficient motion planning.

To further facilitate a lightweight, compact and modular design of the link 1 as depicted in FIGS. 1 to 3 and FIGS. 6 and 7, the link 1 of the present invention further allows for compact and efficient drive capabilities at the first or second joint end 4, 6 of the link 1. To that end a lightweight and space saving joint member or joint part 7 is provided to be arranged at the first or second joint end 4, 6. In particular, the link 1 of the present invention may further comprise a joint part 7 arranged at the first or the second joint end 4, 6, wherein the joint part 7 comprises a drive member 9 providing drive capabilities to the link 1. The drive member 9 allows the link 1 to be driven or moved when the link 1 is used for a driven articulated manipulator, such as an actively driven and controlled robotic arm for example. In an exemplary embodiment the joint part 7 acts as a housing which encircles or encloses at least in part the drive member 9. The housing may provide, for example, structural rigidity to the link and in particular a joint end thereof at which it is arranged. In a further embodiment the housing encloses at least in part the drive member 9, wherein the housing comprises two mutually rotatable joint members, one of which joint member is affixed to the link while the other joint member is arranged for connection to e.g. a further link.

Figure 5:
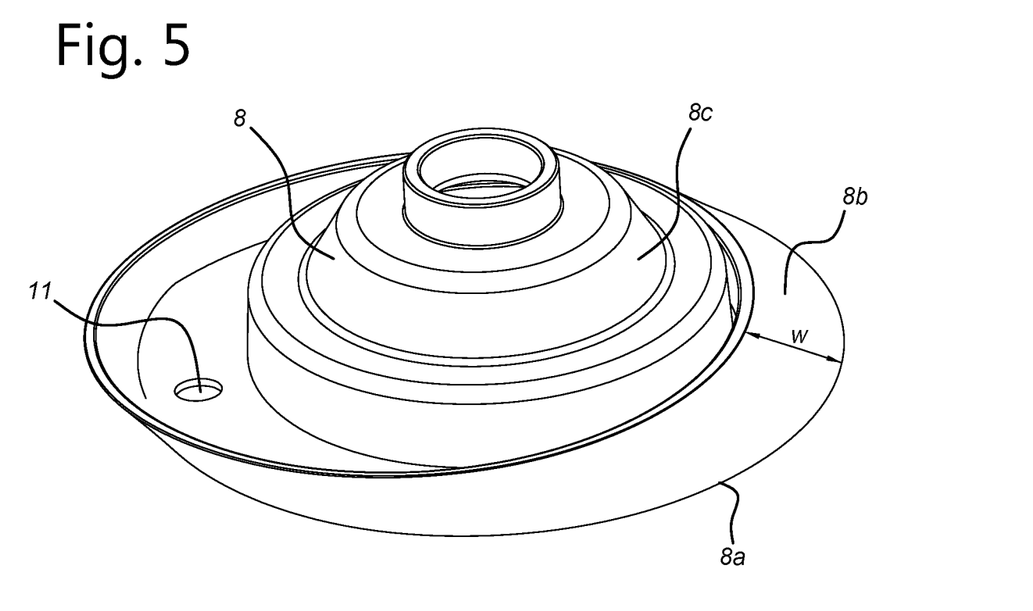
FIG. 5 shows a perspective view of a dome-shape joint member of a joint part according to the present invention.
Figure 6:
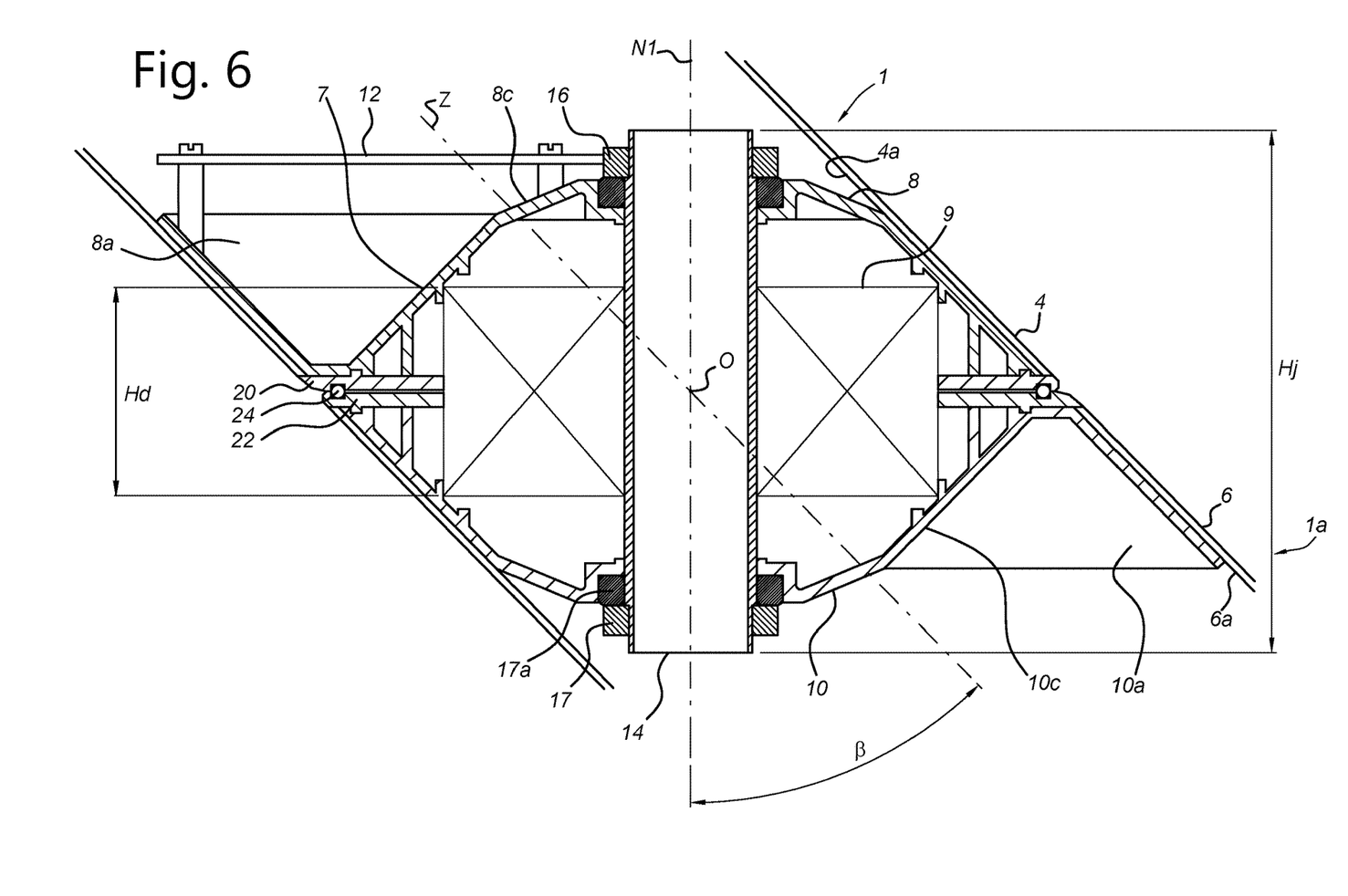
FIG. 6 shows a cross sectional view of a joint part according to the present invention.

The joint part 7 mentioned above may be embodied in various alternative ways, for example, with reference to FIGS. 5 and 6. In FIG. 5 a perspective view is shown of a dome-shaped joint member 8 of a joint member 7 or joint part 7 according to the present invention, and where FIG. 6 shows a cross sectional view of the joint member or joint part 7 according to the present invention.

In the embodiments shown, the link 1 may further comprise a joint member 7 or joint part 7 arranged at the first or the second joint end 4, 6, wherein the joint member or joint part 7 comprises a first and a second dome-shaped joint member 8, 10 that are mutually rotatable and wherein a drive member 9 is arranged there between. The drive member 9 is arranged for driving the first and second dome-shaped joint members 8, 10 with respect to each other. In the embodiment of FIG. 6 a second dome-shaped joint member 10 is rotationally arranged about the normal vector $n_1$ of the first joint plane $p_1$ (not shown) of the first joint end 4. As explained in light of FIG. 4A, 4B, the normal vector $n_1$ may be viewed as an axis of rotation for a further link 1a connected to the first joint end 4.

The joint part 7 not only provides drive capabilities to the link 1 but also increases structural rigidity thereof when firmly mounted to the first or second joint end 4, 6. In an exemplary embodiment, the first and second dome-shaped joint member 8, 10 each comprise a first circumferential mounting flange 8a and a second circumferential mounting flange 10a, respectively, wherein the first or second circumferential mounting flange 8a, 10a is rigidly connected to an inner surface 4a, 6a of the first or second joint end 4, 6. The first and second circumferential mounting flange 8a, 10a each provide a distributed connection along a circumference of the first or second joint end 4, 6. Such a distributed connection may be obtained by e.g. gluing said flanges 8a, 10a to the first or second joint end 4, 6 with an adhesive, thereby increasing structural rigidity and/or stiffness of the first or second joint end 4, 6.

FIG. 5 shows a perspective view of a dome-shaped joint member of the present invention, which for clarity purposes may be viewed as the first dome-shaped joint member 8 as depicted in FIG. 6. In the embodiment shown the first dome shaped-joint member 8 comprises the first circumferential mounting flange 8a for connection to an inner surface 4a, 6a of the first or second joint end 4, 6. In an embodiment the circumferential mounting flange 8a may have an outer surface 8b of sufficient width w, so that good mutual surface contact can be attained between the outer surface 8b and the inner surface 4a, 6a of the first or second joint end 4, 6. The outer surface 8b also allows for a strong connection of the first dome-shaped joint member 8 to the first or second joint end 4, 6 using an adhesive.

To facilitate modularity of the link 1 of the present invention, an embodiment is provided wherein the first and the second dome-shaped joint members 8, 10 are identical, thereby reducing the number of components and simplifying assembly of the link 1. Therefore, the dome shaped-joint member as depicted in FIG. 5 can be used for both the first and the second dome-shaped joint members 8, 10 as depicted in FIG. 6.

Calibration of an articulated manipulator comprising a plurality of links is an important aspect to enable accurate positioning and orientation of an articulated manipulator. There are various ways to calibrate positioning accuracy of an articulated manipulator and the present invention facilitates efficient and convenient calibration by utilizing e.g. optics. For example, in an embodiment the first and the second dome-shaped joint members 8, 10 may each comprise a calibration hole 11. The calibration hole 11 in both the first and the second dome-shaped joint members 8, 10 allows e.g. a light beam to pass through the joint part 7 when each of the calibration holes 11 are in alignment in a calibration configuration of the joint part 7. More precisely, in view of FIG. 6 the second dome-shaped joint member 10 may be rotated so as to align its calibration hole 11 with a calibration hole 11 of the first dome-shaped joint member 8. When both calibration holes are aligned, a light beam is able to pass through the joint part 7 at a predetermined maximum light intensity, thus passing through the respective calibration holes 11 of the first and second dome-shaped joint members 8, 9 mostly unimpeded.

In case of misalignment of the calibration holes 11, the light beam passing through the joint part 7 tends to be at least in part blocked and as such cannot pass at the predetermined maximum light intensity, so that a reduction in light intensity of the light beam can be used as a measure of misalignment for calibration purposes.

So in view of the above, in an embodiment a straight calibration passageway is provided through the joint part 7 extending through each calibration hole 11 of the first and the second dome-shaped joint members 8,10 in a calibration configuration of the joint part 7. The straight calibration passageway extending through the joint part 7 allows the use of e.g. internal optics for minimizing or eliminating the need for expensive and complex external calibration equipment to improve position accuracy of an articulated manipulator.

As depicted in FIG. 6, the drive member 9 is arranged between the first and second dome-shaped joint members 8, 10 for driving the first and second dome-shaped joint member with respect to each other. As the joint part 7 is arranged at least in part within the link 1 and a further link 1a when said links are rotationally connected at their associated joint ends, it is desirable that the joint part 7 is as flat as possible. To that end an embodiment is provided wherein the first or second dome-shaped joint member 8, 10 comprises drive electronics 12 attached to an outer surface 8c, 10c of the first or second dome shaped joint member 8, 10. This embodiment allows the drive electronics controlling the drive member 9 to be positioned at a more convenient location within the link 1 outside the joint part 7 at the outer surface 8c, 10c of the first or second dome-shaped joint members 8, 10. In an exemplary embodiment, the drive electronics 12 comprises a printed circuit board (PCB) arranged outside the joint part 7 on the first or second dome-shaped joint member 8, 10.

As mentioned earlier, the link 1 of the present invention allows for a modular design so that an articulated manipulator, e.g. a driven articulated manipulator, can be obtained by a modular interconnection of a plurality of links 1. To allow for e.g. various electronic wires to pass through the link 1 and to allow convenient (dis)assembly of the joint part 7, an embodiment is provided wherein the joint part 7 further comprises a tubular shaft member 14 extending through the first and the second dome-shaped joint members 8, 10 perpendicular to the first or second joint plane $p_1$, $p_2$, and wherein two independent fastener members 16, 17 are arranged at opposite ends of the tubular shaft member 14 for clamping engagement with the first and the second dome-shaped joint member 8, 10. In this embodiment the tubular shaft member 14 provides an axis of rotation parallel to the first or second normal vector $n_1$, $n_2$ about which the first or second dome shaped joint member 8, 10 can rotate. Furthermore, the tubular shaft member 14 provides a conduit through which e.g. electronic wiring can be routed through the link 1.

The joint part 7 as depicted in FIG. 6 has a total height $H_j$ allowing the joint part 7 to fit at least in part inside the link 1 at the inclination angle β with respect to the longitude axis Z. In particular, as can be seen from the embodiment of FIG. 6, the tubular shaft member 14 provides an axis of rotation at the inclination angle β with respect to the longitudinal axis Z of the tubular body 2, wherein the axis of rotation is parallel to the normal vector $n_1$. Because of the rotated position of the joint part 7, there is a limit to the total height $H_j$ of the joint part 7 and thus a limit to an allowable length of the tubular shaft member 14 that still fits inside the link 1 without touching the inner surface 4a, 6a of the first or second joint end 4, 6. The allowable length of the tubular shaft member 14 may be measured from a point of intersection O of the axis of rotation (i.e. normal vector $n_1$) and the first or second joint plane $p_1$, $p_2$ toward the inner surface 4a, 6a of the first or second joint end 4, 6. In light of this height limitation, the first and second dome-shaped joint members 8, 10 are arranged to provide a housing for the drive member 9 as flat as possible, wherein a maximum allowable height $H_d$ of the drive member 9 is maximized with respect to the total height $H_j$ of the joint part 7. Note that the drive member 9 need not have the maximum allowable height $H_d$ as one or more links for an articulated manipulator may only need limited driving power. So the same first and second dome-shaped joint members 8, 10 of the joint part 7 may be utilized for different sizes of drive members 9.

The two fastener members 16, 17 arranged at opposite ends of the tubular shaft member 14 allow relative rotation between the first and second dome-shaped joint members 8, 10 and simultaneously impose clamping engagement there between. In an advantageous embodiment a bearing member 17a is arranged between one of the two fastener members 16, 17 and the first or second dome-shaped joint members 8, 10. The bearing member 17a facilitates rotation under firm clamping action between the first or second dome-shaped joint member 8, 10 and the tubular shaft member 14. In an embodiment the first or second dome-shaped joint member 8,10 is fixedly connected to the tubular shaft member 14.

In addition to its limited height, the joint part 7 of the present invention further ensures adequate sealing and improved rotation between two rotationally connected links at their respective joint ends. As such an embodiment is provided wherein the first dome-shaped joint member 8 comprises an outermost first circumferential flange member 20 parallel to an outermost second circumferential flange member 22 of the second dome-shaped joint member 10, wherein the first and the second circumferential flange members 20, 22 are in sliding engagement. In this embodiment the first and second circumferential flange members 20, 22 may provide both sealing and/or bearing support through surface contact between the first and second circumferential flange members 20, 22. That is, in an embodiment the first and second outermost circumferential flange members 20, 22 may form a plain bearing that facilitates rotation but also provides sealing between the first and second dome-shaped joint members 8, 10. In an embodiment, the outermost first and second circumferential flange members 20, 22 each comprise an engagement surface parallel to the first or second joint plane $p_1$, $p_2$.

An advantage of the outermost first and second circumferential flange members 20, 22 is that forces and bending moments between two rotationally connected links is distributed over a maximum circumferential area of each associated joint end, thereby maximizing stiffness and rigidity of the joint part 7.

As mentioned above, in an embodiment the first and second dome-shaped joint members 8, 10 may be identical. Therefore, with such an embodiment the outermost first and second circumferential flange members 20, 22 may be identical, ensuring adequate bearing and/or sealing engagement between the first and second circumferential flange members 20, 22.

In a further embodiment it also conceivable that a separate circumferential seal member 24 is arranged between the outermost first and second circumferential flange members 20, 22. The circumferential seal member 24 further facilities closure of the joint part 7 in addition to sealing engagement provided by surface contact between the outermost first and second circumferential flange members 20, 22.

The link 1 of the present invention as disclosed above can be manufactured from a wide variety of materials. For example, in an embodiment the link 1 may be manufactured from steel, an aluminium alloy or even a fibre reinforced material. Furthermore, in an advantageous embodiment the tubular body 2 and the joint part 7, i.e. first and second dome-shaped joint members 8, 10, may be made of the same material, thereby further simplifying the design of the link 1.

In an advantageous embodiment the link 1 may even be manufactured from a plastic material. That is, the tubular body 2 as well as the first and second dome-shaped joint members 8, 10 may be manufactured from plastic material. Moreover, it is also conceivable that the tubular body 2 and the first and second dome-shaped joint members 8, 10 are manufactured from the same plastic material. The plastic material allows for a strong but also for a lightweight modular design of the link 1, so that an articulated manipulator comprising a plurality of plastic links 1 is sufficiently rigid but also lightweight, requiring less power for moving the articulated manipulator.

Referring to FIGS. 1 to 3, because of the mutual twist angle $\alpha$ between the first and second axes X, Y, i.e. the first and second joint planes $p_1, p_2$, the overall shape of the link 1 may become complicated. In an advantageous embodiment the link 1 and/or joint part 7 may therefore be manufactured using an additive manufacturing technique, which is also advantageous when the link 1 is manufactured from a plastic material.

Figure 7:
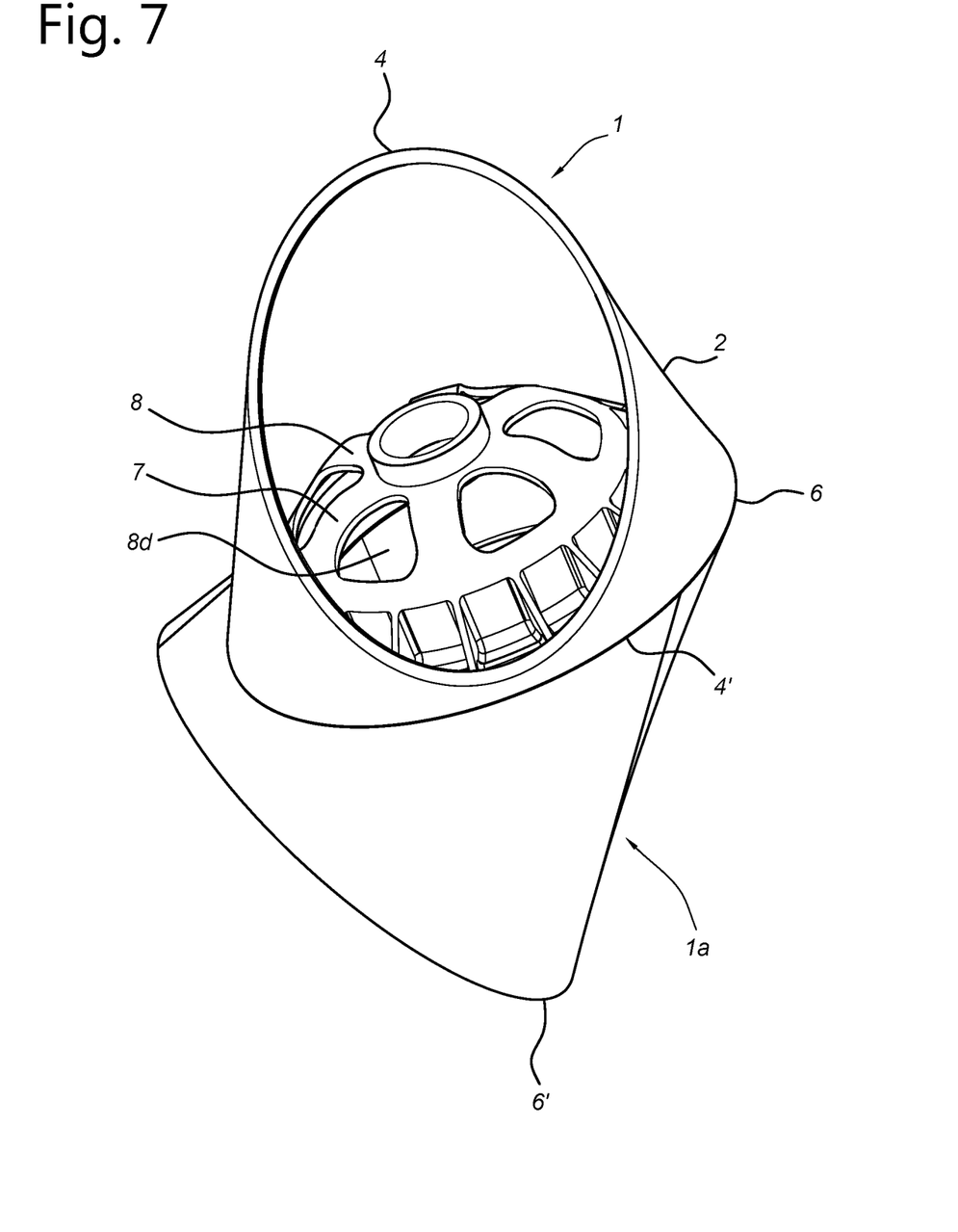
FIG. 7 shows a perspective view of a joint part arranged at a joint end according to the present invention.

FIG. 7 shows a perspective view of a joint part 7 arranged at a joint end according to the present invention. In the embodiment shown, the joint part 7 is arranged at connected joint ends 4', 6 of rotationally connected links 1, 1a. Through the first joint end 4 of the link 1, the first dome-shaped joint member 8 is visible. In an advantageous embodiment, the first and/or second dome-shaped joint members 8, 10 may each comprise one or more apertures 8d for cooling or venting the drive member 9 arranged there between, so that excessive heating of the drive member 9 is prevented but also that excessive heating of an articulated manipulator is minimized or eliminated as hot air can be circulated and vented throughout the entire articulated manipulator.

Figure 8:
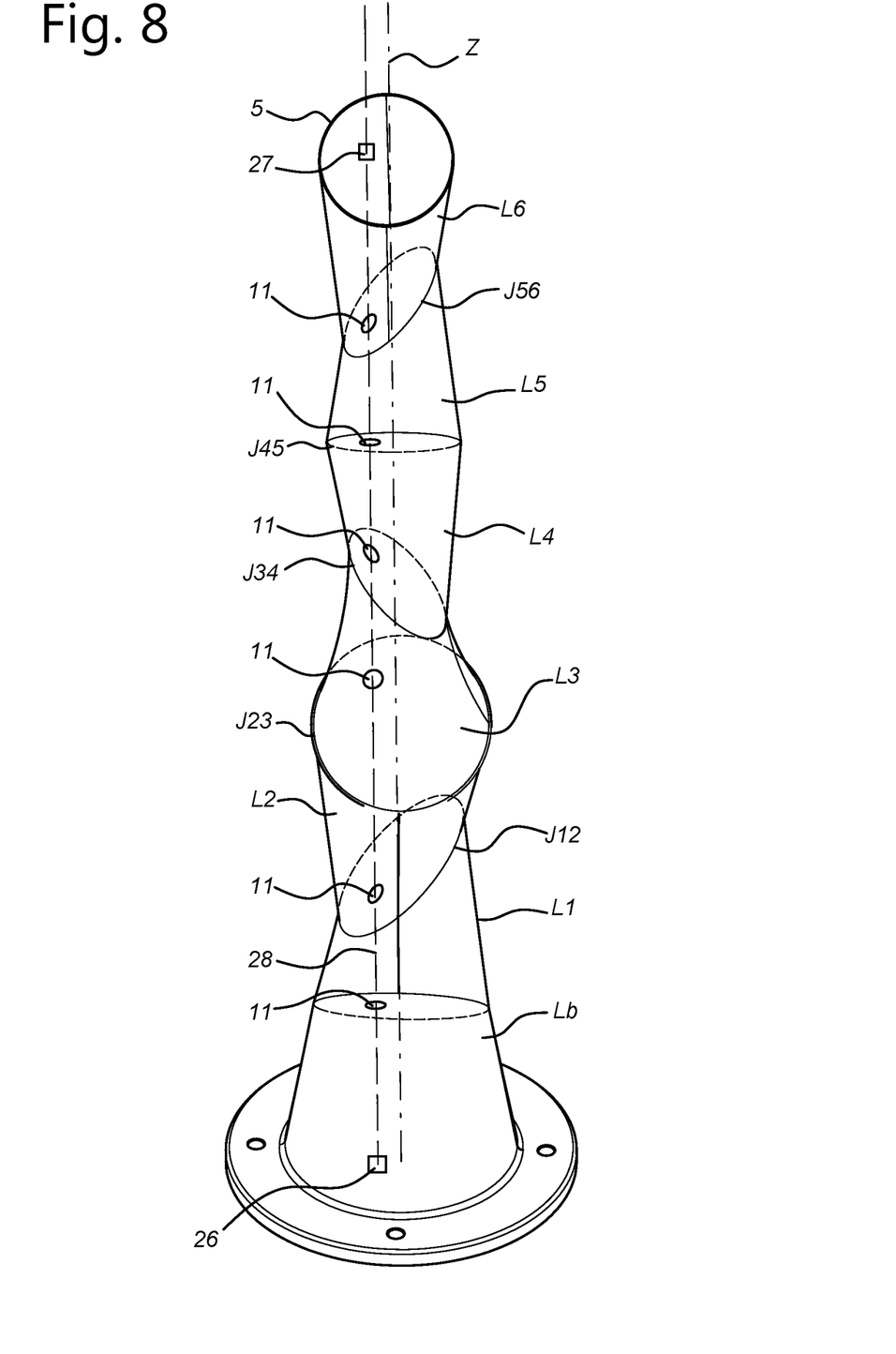
FIG. 8 shows an embodiment of an articulated manipulator according to the present invention.

According to the present invention, an articulated manipulator may comprise a plurality of links 1 as disclosed above. FIG. 8 shows an embodiment of an articulated manipulator according to the present invention. In the exemplary embodiment shown, the articulated manipulator comprises six links $L_1$ to $L_6$ and a base $L_b$. A connection between two links is indicated by the symbol "J". For example, a connection between the links $L_1$ and $L_2$ is indicated as "$J_{12}$", wherein respective joint ends of the links $L_1$ and $L_2$ are connected through a first joint member arranged at and between the respective joint ends of first link $L_1$ and the second link $L_2$. A second joint member then provides a connection $J_{23}$ between the second and third link $L_2, L_3$ and so on. Each of the connections $J_{12}, J_{23}, J_{34}, J_{45}, J_{56}$ comprise mutually engaging joint ends having associated joint planes at the inclination angle $\beta$ Furthermore, in view of the present invention, each of the connections, e.g. $J_{12}, J_{23}$, are also arranged at the mutual twist angle $\alpha$ about the longitudinal axis Z. That is, joint planes of subsequent connections are mutually twisted or rotated by the mutual twist angle $\alpha$ of at least one times the inclination angle $\beta$.

As explained earlier, the joint member or joint part 7 as shown in FIG. 6 comprises a first and a second dome-shaped joint member 8, 10 having arranged there between a drive member 9 for rotating the first and second dome-shaped joint members 8, 10 with respect to each other. Each of the dome-shaped joint members 8, 10 may comprise a calibration hole 11, both of which provide a calibration passageway through the joint part 7 when aligned in a calibration configuration of the joint part 7. In an embodiment the calibration passageway is a straight calibration passageway, allowing a light beam to pass through the articulated manipulator in a straight line.

As shown, in an advantageous embodiment the articulated manipulator may comprising a light source 26 providing a calibration light beam 28 extending through one or more links $L_1$ to $L_6$ of the plurality of links in a calibration configuration of the articulated manipulator, and a light sensor 27 for sensing the calibration light beam in the calibration configuration. The light source 26 may be arranged in/at the base $L_b$ but also in/at other links $L_1$ to $L_6$ if so desired. Likewise, the light sensor 27 may be arranged in/at the base $L_b$ but also in/at other links $L_1$ to $L_6$. In an embodiment, the articulated manipulator may further comprise one or more mirror elements for directing the calibration light beam 28 toward the light sensor 27. This allows the calibration light beam 28 to pass through the articulated manipulator along e.g. obstacles, around bends etc.

In the depicted embodiment the calibration configuration corresponds to a fully stretched posture of the articulated manipulator, i.e. a straight articulated manipulator of which each link is aligned along the longitudinal axis Z. Such an alignment of links is made possible as links are provided with opposing joint planes or joint faces at the inclination angle $\beta$ with respect to the longitudinal axis Z, and wherein opposing joint planes or joint faces associated with each of the links are arranged at a mutual twist angle $\alpha$ of at least one times the inclination angle $\beta$.

The link 1 of the present invention as described above may comprise a joint part 7 having two dome-shaped joint members 8, 10 that are rotationally arranged and a drive member 9 positioned there between for driving the two dome-shaped joint members 8, 10 relative to each other. Each of the dome-shaped joint members 8,10 may comprise a calibration hole 11, wherein both of the calibration holes 11 may be aligned or partially aligned in the calibration configuration of the joint part 7 providing a calibration passageway there through. Note that the dome-shaped joint members 8, 10 have not been drawn explicitly and a single calibration hole 11 has been depicted for the connections $J_{12}, J_{23}, J_{34}, J_{45}, J_{56}$ between the links $L_1$ to $L_6$. In the depicted embodiment the calibration hole 11 may be associated with the calibration passageway extending through the joint part 7 as disclosed above, thus extending through the connections $J_{12}, J_{23}, J_{34}, J_{45}, J_{56}$.

The advantage of the light source 26, light sensor 27, and the calibration configuration of the articulated manipulator is that a convenient and efficient calibration method can be performed by monitoring light intensity as the calibration light beam 28 passes through each calibration passageway embodied as the calibration holes 11 of the various joint members and connections $J_{12}$, $J_{23}$, $J_{34}$ $J_{45}$, $J_{56}$ thereof.

In case of perfect alignment of all calibration holes 11 in the stretched position of the articulated manipulator, a maximum intensity of the calibration light beam 28 can be measured. However, should there be some misalignment between two or more connected links in the calibration configuration, so that one or more calibration passageways through associated joint members become partially or completely restricted, the calibration light beam 28 tends to lose light intensity. Consequently, differences between light intensities of the calibration light beam 28 can be associated with e.g. positional and/or rotational perturbations that must be compensated for maximum position accuracy of, for example, an end effector 5 connected to an outermost link.

For an articulated manipulator as embodied in FIG. 7 there is a convenient way to choose the twist angle α for each link 1 so that the workplace volume of the articulated manipulator is evenly distributed about, for example, the longitudinal axis Z. In particular, a twist angle α can be determined by dividing 360° degrees by the number of links used for the articulated manipulator. So in case six links are used, the twist angle α can be set at 360/6=60° degrees. When seven links are used, the twist angle α can be set at 360/7=51.42° degrees. And when eight links are used, the twist angle α can be set at 360/8=45° degrees. In this way the articulated manipulator will provide at least an evenly distributed workspace volume about the longitudinal axis Z. Note that in each of these cases it is possible to choose an inclination angle β of 45° degrees, for example, so that the twist angle α is at least one times the inclination angle for six, seven or even eight links.

In view of the disclosure above, the present invention can now be summarised by the following embodiments:

Embodiment 1. Link for an articulated manipulator, comprising a tubular body (2) extending along a longitudinal axis (Z) thereof and having a first joint end (4) and a second joint end (6), wherein the first joint end (4) and the second joint end (6) define a first joint plane ($p_1$) and a second joint plane ($p_2$), respectively, wherein the first joint plane ($p_1$) has a first normal vector ($n_1$) and wherein the second joint plane ($p_2$) has a second normal vector ($n_2$), wherein the first and second normal vector ($n_1$, $n_2$) are each at an inclination angle (β) with respect to the longitudinal axis (Z), wherein the first joint plane ($p_1$) is arranged parallel to a first axis (X) and wherein the second joint plane ($p_2$) is arranged parallel to a second axis (Y), the longitudinal axis (Z) being perpendicular to the first axis (X) and the second axis (Y), and wherein the first axis (X) and the second axis (Y) are at a mutual twist angle (α) of at least one times the inclination angle (β).

Embodiment 2. Link according to embodiment 1, wherein the twist angle (α) is at least two times the inclination angle (β).

Embodiment 3. Link according to embodiment 1 or 2, wherein the inclination angle (β) is between 30° and 60° degrees.

Embodiment 4. Link according to any one of embodiments 1-3, wherein the first joint end (4) and the second joint end (6) each comprise a circular circumference.

Embodiment 5. Link according to embodiment 4, wherein the circular circumference of the first joint end (4) has a different radius ($r_1$) than a radius ($r_2$) of the circular circumference of the second joint end (6).

Embodiment 6. Link according to embodiment 1-5, further comprising a joint member (7) or joint part (7) arranged at the first or the second joint end (4, 6), the joint member or joint part (7) comprising a first and a second dome-shaped joint member (8, 10) that are mutually rotatable and a drive member (9) arranged there between.

Embodiment 7. Link according to embodiment 6, wherein the first and second dome shaped joint member (8, 10) each comprise a first circumferential mounting flange (8a) and a second circumferential mounting flange (10a), respectively, the first or second circumferential mounting flange (8a, 10a) being affixed to an inner surface (4a, 6a) of the first or second joint end (4, 6).

Embodiment 8. Link according to embodiment 6 or 7, wherein the first and the second dome-shaped joint member (8, 10) are identical.

Embodiment 9. Link according to any one of embodiments 6-8, wherein the first and the second dome-shaped joint member (8, 10) each comprise a calibration hole (11).

Embodiment 10. Link according to any one of embodiments 6-9, wherein the first or the second dome-shaped joint member (8, 10) comprises drive electronics (12) attached to an outer surface of the first or second dome shaped joint member (8,10).

Embodiment 11. Link according to any one of embodiments 6-10, wherein the joint member (7) further comprises a tubular shaft member (14) extending through the first and the second dome-shaped joint member (8,10) perpendicular to the first or second joint plane ($p_1$, $p_2$), and two independent fastener members (16, 17) arranged at opposite ends of the tubular shaft member (14) for clamping engagement with the first and the second dome-shaped joint member (8,10).

Embodiment 12. Link according to any one of embodiments 6-11, wherein the first dome-shaped joint member (8) comprises an outermost first circumferential flange member (20) parallel to an outermost second circumferential flange member (22) of the second dome shaped joint member (10), the first and the second circumferential flange members (20, 22) being in sliding engagement.

Embodiment 13. Link according to embodiment 12, wherein the joint member (7) comprises a circumferential seal member (24) arranged between the outermost first and the second circumferential flange members (20,22).

Embodiment 14. Articulated manipulator comprising a plurality of mutually rotatable connected links according to any one of embodiments 1-13.

Embodiment 15. Articulated manipulator according to embodiment 14, comprising a light source (26) providing a calibration light beam (28) extending through one or more of the plurality of links in a calibration configuration of the articulated manipulator, and a light sensor (27) for sensing the calibration light beam (28) in the calibration configuration.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A link for an articulated manipulator, comprising a tubular body extending along a longitudinal axis thereof and having a first joint end and a second joint end, wherein the first joint end and the second joint end define a first joint plane and a second joint plane, respectively, wherein the first joint plane has a first normal vector and wherein the second joint plane has a second normal vector, wherein the first and second normal vector are each at an inclination angle with respect to the longitudinal axis, wherein the first joint plane is arranged parallel to a first axis and wherein the second joint plane is arranged parallel to a second axis, the longitudinal axis being perpendicular to the first axis and the second axis, wherein the first axis and the second axis are at a mutual twist angle of at least one times the inclination angle, and wherein the link further comprises a joint part arranged at the first or the second joint end, the joint part comprising a drive member providing drive capabilities to the link, wherein the joint part comprises a first and a second dome-shaped joint member that are mutually rotatable and wherein the drive member is arranged between the first and the second dome-shaped joint member.

2. The link according to claim 1, wherein the twist angle is at least two times the inclination angle.

3. The link according to claim 1, wherein the inclination angle is between 30° and 60° degrees.

4. The link according to claim 1, wherein the first joint end and the second joint end each comprise a circular circumference.

5. The link according to claim 4, wherein the circular circumference of the first joint end has a different radius than a radius of the circular circumference of the second joint end.

6. The link according to claim 1, wherein the first and second dome shaped joint member each comprise a first circumferential mounting flange and a second circumferential mounting flange, respectively, the first or second circumferential mounting flange being affixed to an inner surface of the first or second joint end.

7. The link according to claim 1, wherein the first and the second dome-shaped joint member are identical.

8. The link according to claim 1, wherein the first and the second dome-shaped joint member each comprise a calibration hole.

9. The link according to claim 1, wherein the first or the second dome-shaped joint member comprises drive electronics attached to an outer surface of the first or second dome shaped joint member.

10. The link according to claim 1, wherein the joint part further comprises a tubular shaft member extending through the first and the second dome-shaped joint member perpendicular to the first or second joint plane, and two independent fastener members arranged at opposite ends of the tubular shaft member for clamping engagement with the first and the second dome-shaped joint member.

11. The link according to claim 1, wherein the first dome-shaped joint member comprises an outermost first circumferential flange member parallel to an outermost second circumferential flange member of the second dome shaped joint member, the first and the second circumferential flange members being in sliding engagement.

12. The link according to claim 11, wherein the joint part comprises a circumferential seal member arranged between the outermost first and the second circumferential flange members.

13. An articulated manipulator comprising a plurality of mutually rotatable connected links according to claim 1.

14. The articulated manipulator according to claim 13, comprising a light source providing a calibration light beam extending through one or more of the plurality of links in a calibration configuration of the articulated manipulator, and a light sensor for sensing the calibration light beam in the calibration configuration.

* * * * *